US012812058B2

(12) United States Patent
Nakamoto

(10) Patent No.: US 12,812,058 B2
(45) Date of Patent: Nov. 24, 2026

(54) INFORMATION PROCESSING APPARATUS, METHOD FOR CONTROLLING THE INFORMATION PROCESSING APPARATUS, AND STORAGE MEDIUM

(71) Applicant: CANON KABUSHIKI KAISHA, Tokyo (JP)

(72) Inventor: Hiroshi Nakamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 237 days.

(21) Appl. No.: 18/776,996

(22) Filed: Jul. 18, 2024

(65) Prior Publication Data

US 2025/0080676 A1 Mar. 6, 2025

(30) Foreign Application Priority Data

Aug. 30, 2023 (JP) ................................ 2023-139920

(51) Int. Cl.
*H04N 1/32* (2006.01)
*H04N 1/00* (2006.01)

(52) U.S. Cl.
CPC ....... *H04N 1/3247* (2013.01); *H04N 1/00472* (2013.01)

(58) Field of Classification Search
None
See application file for complete search history.

(56) References Cited

U.S. PATENT DOCUMENTS

| | | | | |
|---|---|---|---|---|
| 2009/0059286 A1* | 3/2009 | Yamaguchi | H04N 1/32 | |
| | | | 358/1.15 | |
| 2020/0272385 A1* | 8/2020 | Navarro | G06F 3/1253 | |
| 2023/0205465 A1* | 6/2023 | Onoguchi | G06F 3/1205 | |
| | | | 358/1.15 | |

FOREIGN PATENT DOCUMENTS

| | | |
|---|---|---|
| JP | 2023-19365 A | 2/2023 |

* cited by examiner

*Primary Examiner* — Darryl V Dottin
(74) *Attorney, Agent, or Firm* — VENABLE LLP

(57) ABSTRACT

An information processing apparatus includes an obtaining unit configured to obtain information on the type of printing process in a case where target data is printed, an acceptance unit configured to accept an operation to lay out the target data in a layout area, and a notification unit configured to provide a notification about target data to be laid out in the layout area in a case where target data whose type of printing process is different is included in the layout area by an operation to lay out the target data accepted by the acceptance unit in the layout area.

14 Claims, 14 Drawing Sheets

FIG.9
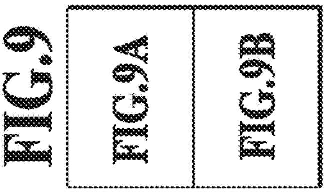
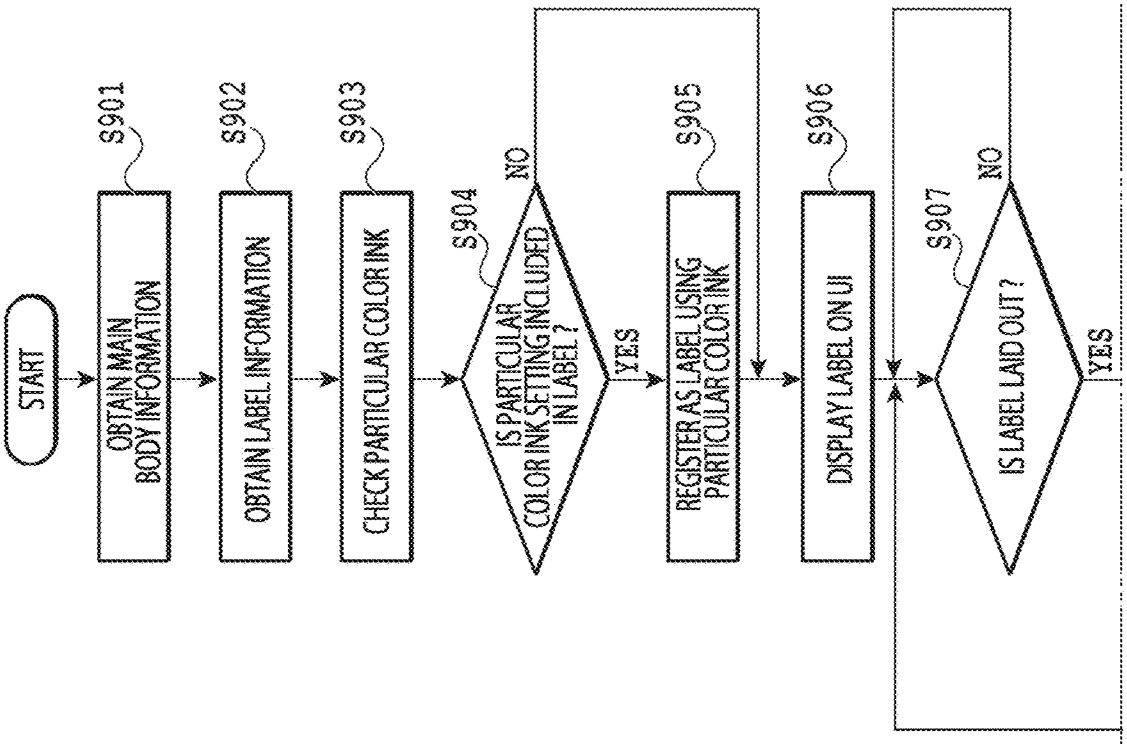
FIG.9A

| FIG.12A |
| --- |
| FIG.12B |

INFORMATION PROCESSING APPARATUS, METHOD FOR CONTROLLING THE INFORMATION PROCESSING APPARATUS, AND STORAGE MEDIUM

BACKGROUND

Field

The present disclosure relates to an information processing apparatus, a method for controlling the information processing apparatus, and a storage medium.

Description of the Related Art

In commercial printing in which label printing is performed, data created by graphics software or the like (PDF [Portable Document Format] or the like) is submitted to printing companies. Some submitted data includes a particular color setting set by graphics software. A particular color setting is to designate an object which uses a particular color ink mounted on a commercial printing machine main body in a label design. Printing in the particular color ink allows the extension of the range of designs. In contrast, printing in the particular color ink takes more printing time as printing processes are increased, and thus a technique to improve printing efficiency is demanded.

In Japanese Patent Laid-Open No. 2023-019365, a technique to collectively manage information on a printing machine main body having multiple functions such as printing and cutting is provided. A setting which is performed by the printing machine main body in the first place can be performed on a user interface displayed on an information processing apparatus by obtaining information on the printing machine main body and displaying the information on the user interface.

SUMMARY

A further technique to improve the usability of printing in a particular color ink is demanded.

An information processing apparatus of an aspect of the present disclosure includes an obtaining unit configured to obtain information on the type of printing process in a case where target data is printed, an acceptance unit configured to accept an operation to lay out the target data in a layout area, and a notification unit configured to provide a notification on target data to be laid out in the layout area in a case where the target data whose type of printing process is different is included in the layout area by the operation to lay out the target data accepted by the acceptance unit in the layout area.

Further features of the present invention will become apparent from the following description of exemplary embodiments with reference to the attached drawings.

BRIEF DESCRIPTION OF THE DRAWINGS

FIG. 9 is a diagram showing the relationship of FIGS. 9A and 9B;

FIGS. 9A and 9B are flowcharts for performing a warning display;

DESCRIPTION OF THE EMBODIMENTS

The present embodiments are explained below with reference to the drawings. Incidentally, the following embodiments are examples to explain the present disclosure and does not purport that the present disclosure is limited to the embodiments only.

Embodiment 1

<Regarding an Information Processing Apparatus>

Figure 1:
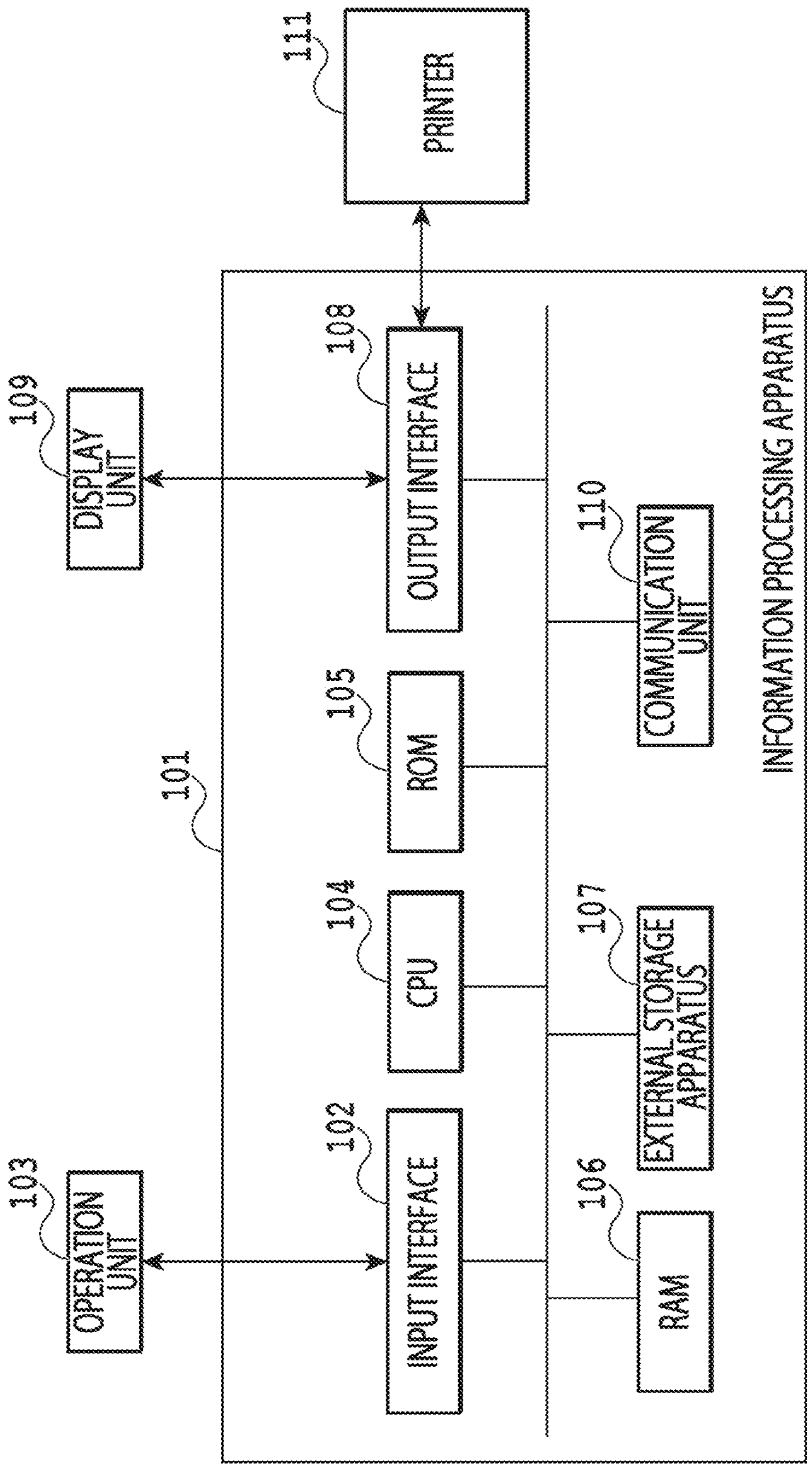
FIG. 1 is a diagram showing a system summary.

First, an information processing apparatus of the present embodiment is explained with reference to a block diagram of FIG. 1.

An information processing apparatus 101 has an input interface 102, an operation unit 103, a CPU 104, a ROM 105, a RAM 106, an external storage apparatus 107, an output interface 108, a display unit 109, and a communication unit 110 or the like. Incidentally, these are connected to each other via a system bus.

The input interface 102 is an interface to accept a data input and an operation instruction from a user via the operation unit 103 to be described later.

The operation unit 103 includes an operator such as a physical keyboard, a button, or a touch panel or the like. Incidentally, the display unit 109 to be described hereinafter and the operation unit 103 may be integrated at least in part. Further, for example, an embodiment which outputs a screen and accepts an operation from the user on the same screen may be applicable.

The CPU 104 is a system control unit and controls the whole of the information processing apparatus 101 such as the execution of a program and the activation of hardware. The ROM 105 stores fixed data such as a control program, a data table, an embedded operating system (hereinafter referred to as OS) executed by the CPU 104. In the present embodiment, each control program stored in the ROM105 performs software execution control, for example, scheduling, task switch, interruption processing or the like under the management of the embedded OS stored in the ROM 105.

The RAM 106 is composed of a SRAM (Static Random Access Memory) or DRAM or the like which needs a backup power supply. Incidentally, the RAM 106 may retain data by using a primary battery for a data backup not illustrated. In that case, the RAM 106 can store important data such as a program control variable without volatilization. Further, a memory area which stores setting information of the information processing apparatus 101 or management data of the information processing apparatus 101 or the like is also provided in the RAM 106. Furthermore, the RAM 106 is used as a main memory and a work memory of the CPU 104.

The external storage apparatus 107 stores various applications or content data treated by the applications or the like. The output interface 108 is an interface performing control to notify a printer 111 or the display unit 109 of display control of data or the state of the information processing apparatus 101.

The display unit 109 is composed of an LED (light-emitting diode) or an LCD (liquid crystal display) or the like and provides a notification of display of data or the state of the information processing apparatus 101. Incidentally, the acceptance of the input from the user may be performed via the display unit 109 by installing a software keyboard including keys such as a numeral input key, a mode setting key, a determination key, a cancel key, or a power supply key on the display unit 109. The communication unit 110 is connected to an external apparatus and performs data communication.

The printer 111 prints printing data generated by the information processing apparatus 101 and transfers setting information on the printer 111 or the like to the information processing apparatus 101. An explanation is made below on the premise that the present embodiment is connected to a label printer having the function of printing in a particular color.

<Label Printing in a Particular Color Ink>

In the present embodiment, label data for label printing includes label data in which the particular color ink is used and label data in which the particular color ink is not used. In the present embodiment, the particular color ink refers to a white ink. As a use of printing in the white ink, a case where it is desirable to print patterning or a character in the white ink is conceivable. Additionally, there is a case where printing is performed in the white ink as a background of color printing. The effect of a background color of a print medium can be removed to perform color printing by performing background printing in the white ink and performing color printing thereon. Further, in a case of a transparent print medium, the background printing can prevent a color printing part from being transparent. In a case where the background printing is not performed in the white ink, sometimes a printing result may not have a normal tint because of the effect of the background color of the printing medium.

In commercial printing, printing takes more time in a case where printing is performed in the particular color ink. In a case where the data in which printing is performed in the particular color and the data in which printing is performed without using the particular color are laid out together, the user has difficulty in selecting a layout pattern to make printing time less only by displaying information on the main body.

For example, in commercial printing, it is necessary to efficiently lay out various types of printing data and print a large amount of the printing data, but it is difficult for the user to check, in layout data, printing data which has a setting of the particular color of a commercial printing machine.

Therefore, in order to achieve less printing time, the user needs to perform layout in consideration of subsequent printing time in a layout process executed by printing software in which imposition or the like is performed, and this applies a load of layout on the user.

In the following embodiment, a method for reducing the possibility of occurrence of a mixed layout of a label which uses the particular color ink and a label which does not use the particular color ink is explained. The purpose is to reduce printing time by reducing the possibility of the mixture. Incidentally, in the following explanation, "printing time" refers to printing time which is defined by the type of printing process. In the present embodiment, the type of printing process includes the presence or absence of the use of the particular color ink. Accordingly, for example, in a case where two types of labels in which the particular color ink is not used are laid out, the labels do not have the completely same printing time, but there is no difference between the labels in the types of the printing processes, and thus the printing time is perceived to be the same.

<Application>

Figure 2:
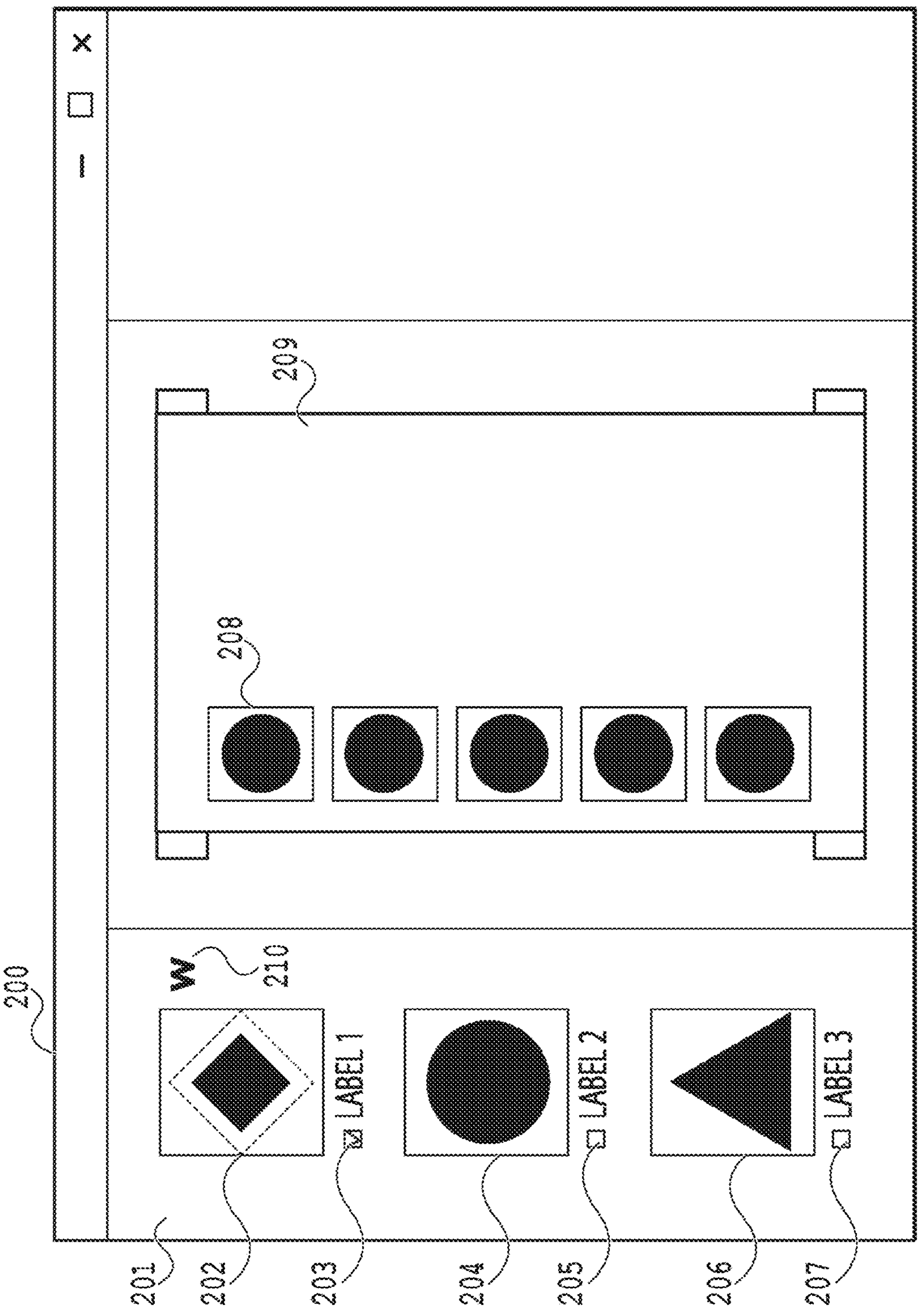
FIG. 2 is a diagram showing a display screen of a print application.

FIG. 2 shows a display screen of an application of the present embodiment. The present application is mounted on the external storage apparatus 107 and can perform printing by imposing data on the printer 111. An application screen 200 has a layout target data selection area 201 to select layout target data to be laid out and a layout area 209 to display a layout state as a display area. In FIG. 2, three pieces of layout target data are displayed in the layout target data selection area 201. However, more than three pieces of data exist in reality although not displayed. The displayed layout target data may be displayed by a scroll operation or the like.

For example, in a case where layout target data 204 without a particular color is selected as layout target data, data selected by the user can be arranged in a line as in a layout state 208. Further, for example, in a case where the user further selects additional layout data in a state where the printing target data is laid out in a first column, the selected layout target data is arranged in a second column of the layout area.

Some embodiments are explained below in the information processing apparatus of the above configuration. Incidentally, in the following embodiment below, in regard to the way to call a label to be printed, the label to be printed is referred to as "layout target data" at a stage in which the label is displayed in the layout target data selection area 201 and is referred to as "printing target data" at a stage in which the label is arranged in the layout area 209.

FIG. 2 shows that the layout target data 204 without the particular color is laid out in the layout area 209. The layout target data 204 without the particular color is arranged in the layout area 209 in response to a check box 205 being marked in the layout target data selection area 201. The check box can switch between ON and OFF by a click operation, for example.

Figure 3:
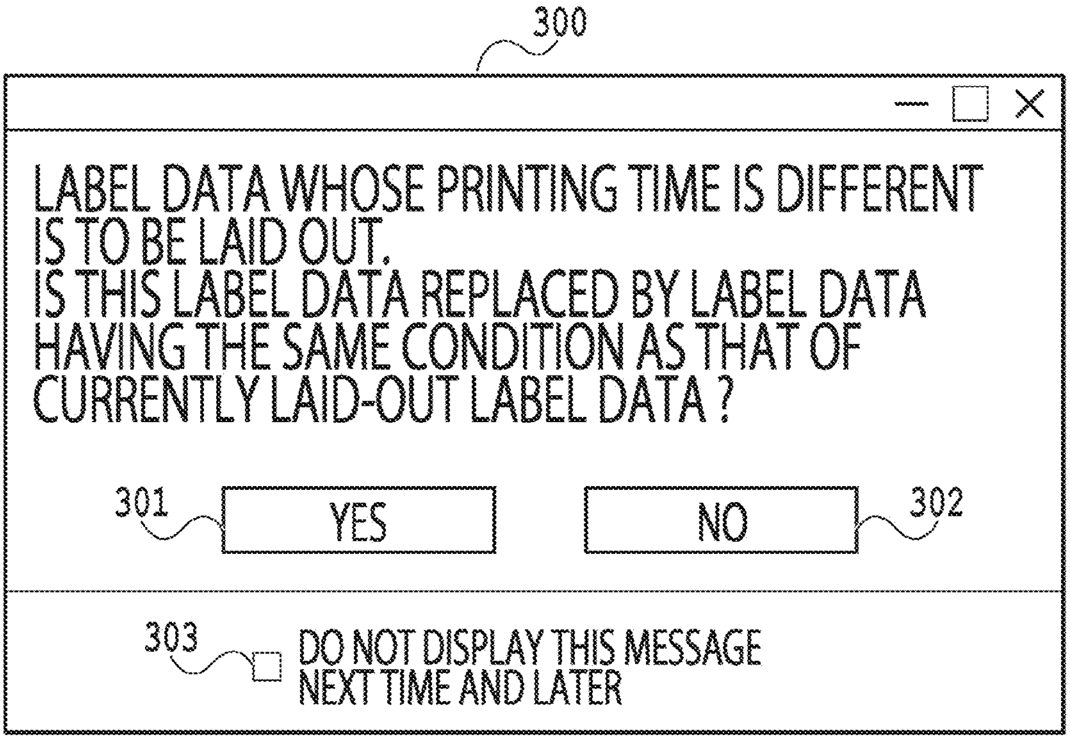
FIG. 3 is a diagram showing an example of a warning message.

FIG. 3 is a diagram showing a warning message 300 (notification screen) in the present embodiment. The warning message 300 is displayed (notified) in a case where a check box 203 is changed from an OFF state to an ON state to additionally lay out layout target data 202 with the particular color from the layout target data selection area 201 in a layout state illustrated in FIG. 2. The warning message 300 is displayed to indicate that printing time of the printing target data 204 which is currently in a layout state differs from printing time of the layout target data 202 to be added. That is, the warning message 300 is displayed because labels having different printing time are laid out in the same layout area 209. Hereinafter, the warning message 300 is also referred to as a warning message 1.

"LANE" displayed in the warning message 300 means a column in which printing target data is consecutively arranged in the layout area 209. In a case where a YES button 301 of the warning message 300 is selected, processing to replace the layout target data without the particular color with the layout target data without the particular color (for example, layout target data 206) which is no different from the printing target data 204 in printing time in the layout target data selection area 201. In a case where a NO button 302 is selected, processing to maintain the layout state of the printing target data 202 with the particular color is executed. That is, the user can select subsequent processing in each button arranged in the warning message. Incidentally, the warning message 300 of subsequent mixture is not displayed by marking the check box 303.

Figure 4:
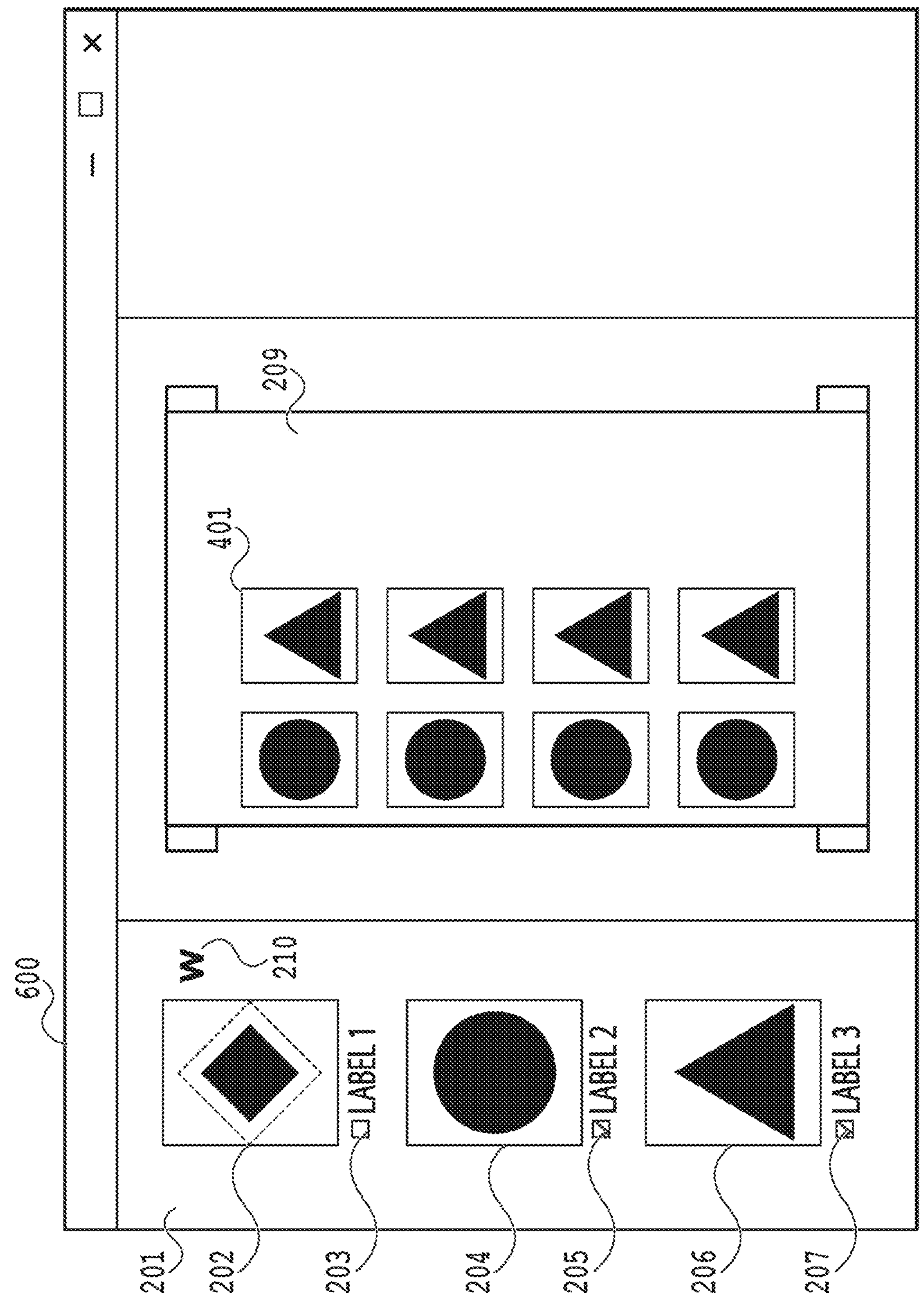
FIG. 4 is a diagram showing a display screen of the print application.

FIG. 4 is a diagram showing a layout state 401 in a case where the YES button 301 is selected in the warning message 300 of FIG. 3. It can be seen that the printing target data 202 with the particular color is replaced by the printing target data 206 without the particular color.

Figure 5:
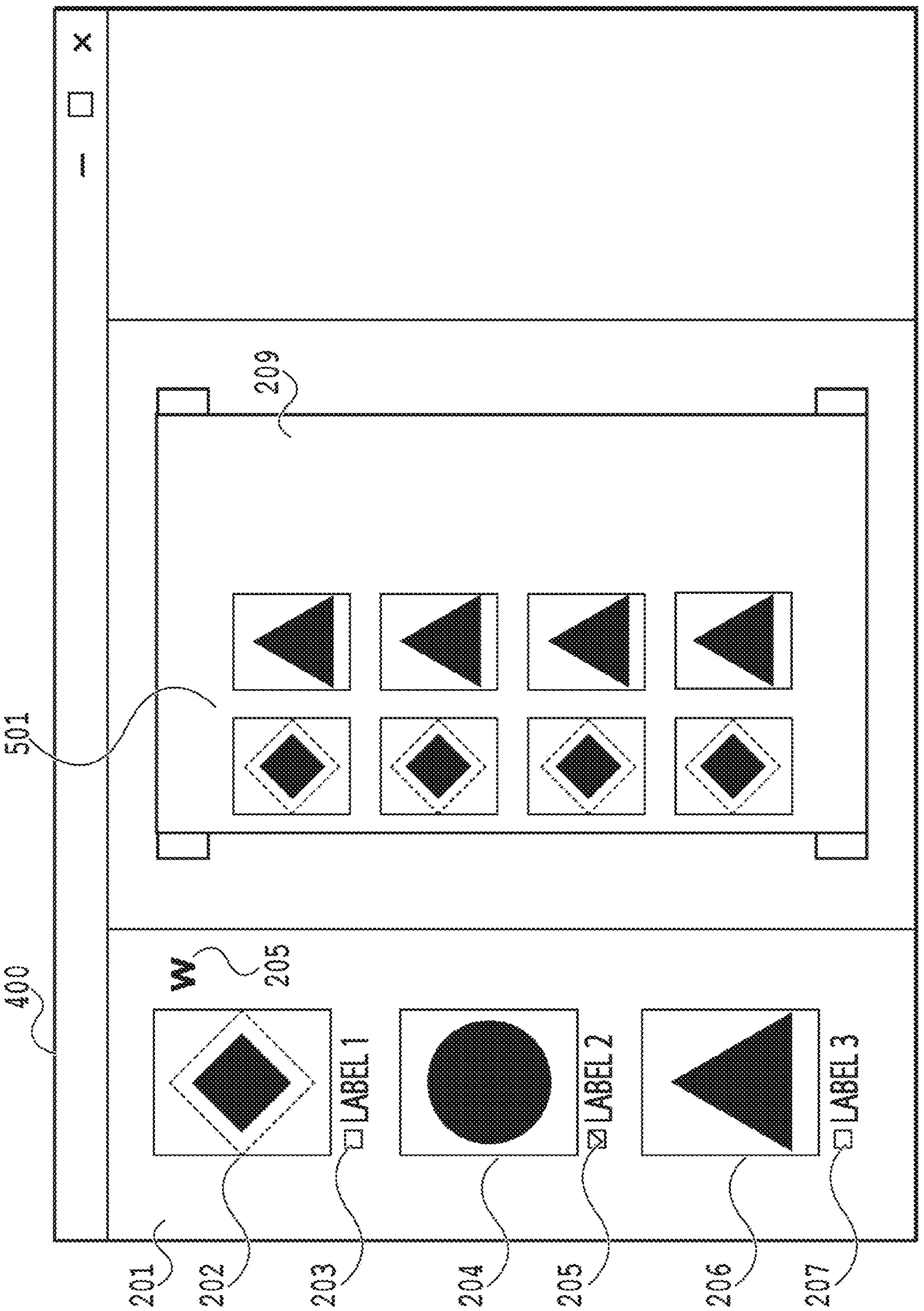
FIG. 5 is a diagram showing a display screen of the print application.

Next, FIG. 5 is a diagram explaining a layout of a different case from the aforementioned case. In FIG. 5, the printing target data 202 with the particular color is arranged in the first column and the printing target data 206 without the particular color is arranged in the second column in a layout state 501 in the layout area 209.

Figure 6:
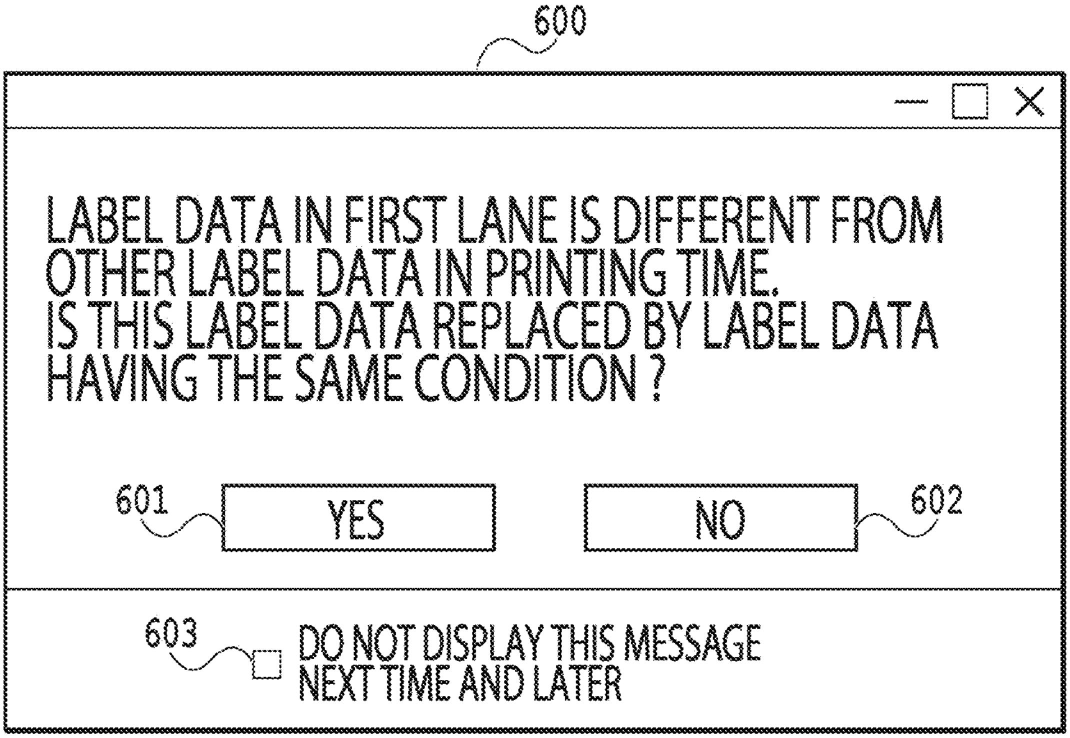
FIG. 6 is a diagram showing an example of a warning message.

FIG. 6 is a diagram showing a warning message 600 in the present embodiment. The warning message 600 is displayed in a case where the amount of the printing target data with the particular color which has been laid out is different from the amount of the printing target data without the particular color by arranging the selected layout target data. In a case of FIG. 5, for example, in a case where the layout target data 204 without the particular color is arranged in a third column, in the laid-out printing target data, the amount of the printing target data without the particular color is larger than that of the printing target data with the particular color. Thus, the warning message 600 is displayed. Further, in a case where a YES button 601 is selected, processing to replace the printing target data 202 with the particular color in the first column which print target data is smaller in amount of the printing target data with the particular color and the printing target data without the particular color with the printing data without the particular color which exists in the layout target data selection area 201 is executed. Incidentally, in a case where the layout target data with the particular color is arranged in the third column in the layout state 501 as illustrated in FIG. 5, the warning message 600 is also displayed because the amounts of both the printing target data with the particular color and the printing target data without the particular color are different. At this time, the wording from the warning message says "LABEL DATA IN SECOND LANE IS LABEL DATA WHICH HAS DIFFERENT PRINTING TIME . . . " That is, the warning message 600 is a warning to replace the printing target data whose amount is smaller with the printing target data whose amount is larger. Furthermore, in a case where a NO button 602 is selected, processing to maintain the layout state is executed without replacing the printing target data whose amount is smaller with the printing target data whose amount is larger. Incidentally, the warning message 600 of subsequent mixture is not displayed by marking the check box 603. Hereinafter, the warning message 600 is also referred to as a warning message 2.

Figure 7:
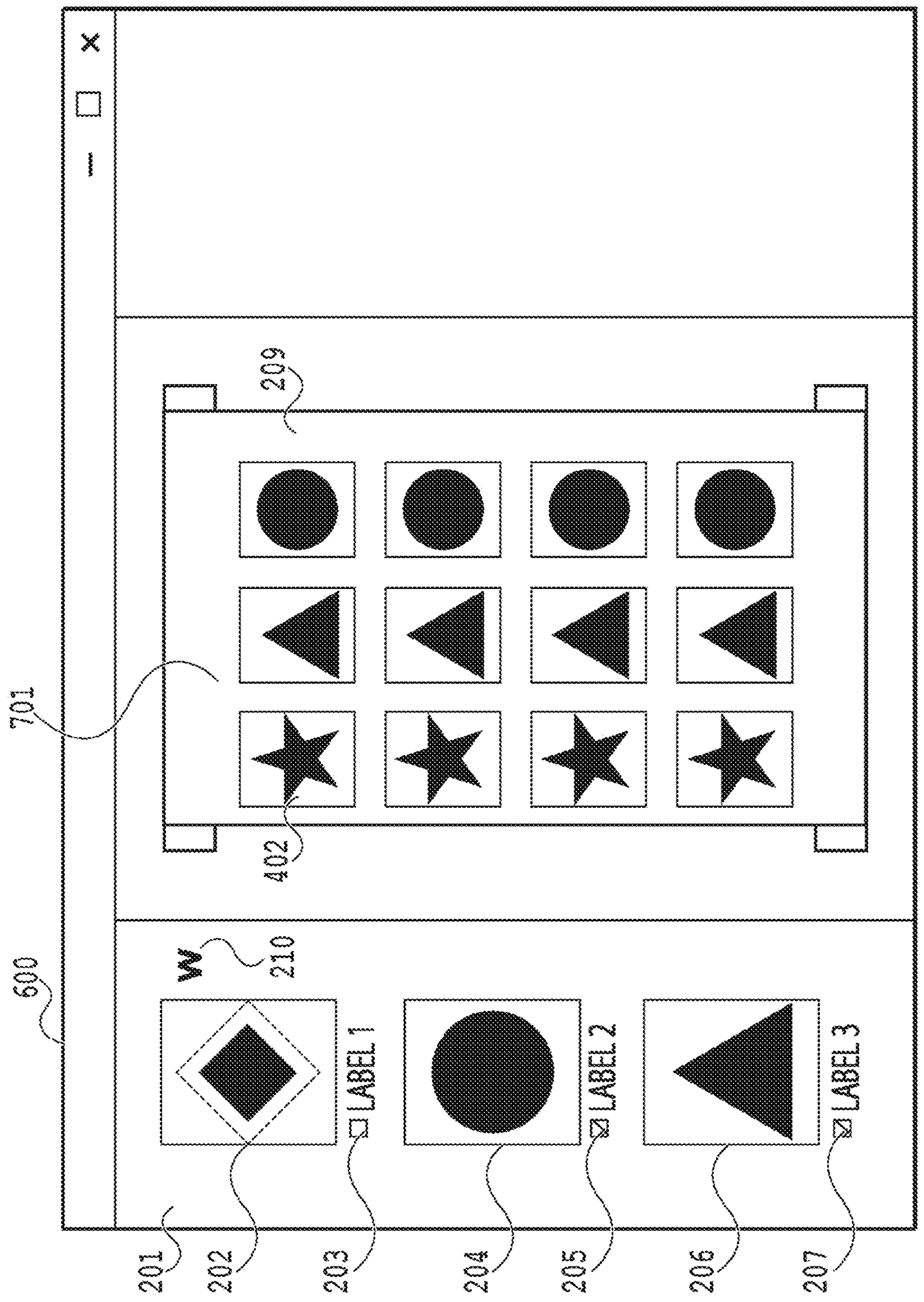
FIG. 7 is a diagram showing a display screen of the print application.

FIG. 7 is a diagram showing a layout state 701 in a case where the YES button 601 is selected in the warning message 600 of FIG. 6. It is found that the printing target data 204 without the particular color in the third column is arranged because the user marks the check box 205. In addition, the printing target data without the particular color in the first column is replaced by other printing target data without the particular color (star-shaped label) by selecting the YES button 601 in the warning message 600. Incidentally, in the layout state 501 illustrated in FIG. 5, in a case where the printing target data with the particular color is arranged in the third column, there is performed processing to replace a small amount of layout target data without particular color with the layout target data with the particular color which exists in the layout target selection area 201.

Replacement processing of the printing target data in two cases is explained above with reference to FIGS. 2 to 4 or FIGS. 5 to 7. The possibility of the arrangement of the printing target data whose condition of the presence or absence of the particular color is different in the same layout area can be reduced by the execution of the processing. This enables the printing time to shorten compared with the layout in which conditions of the particular color are mixed. Further, display of a warning enables the user to recognize a layout state in which printing takes time.

Figure 8:
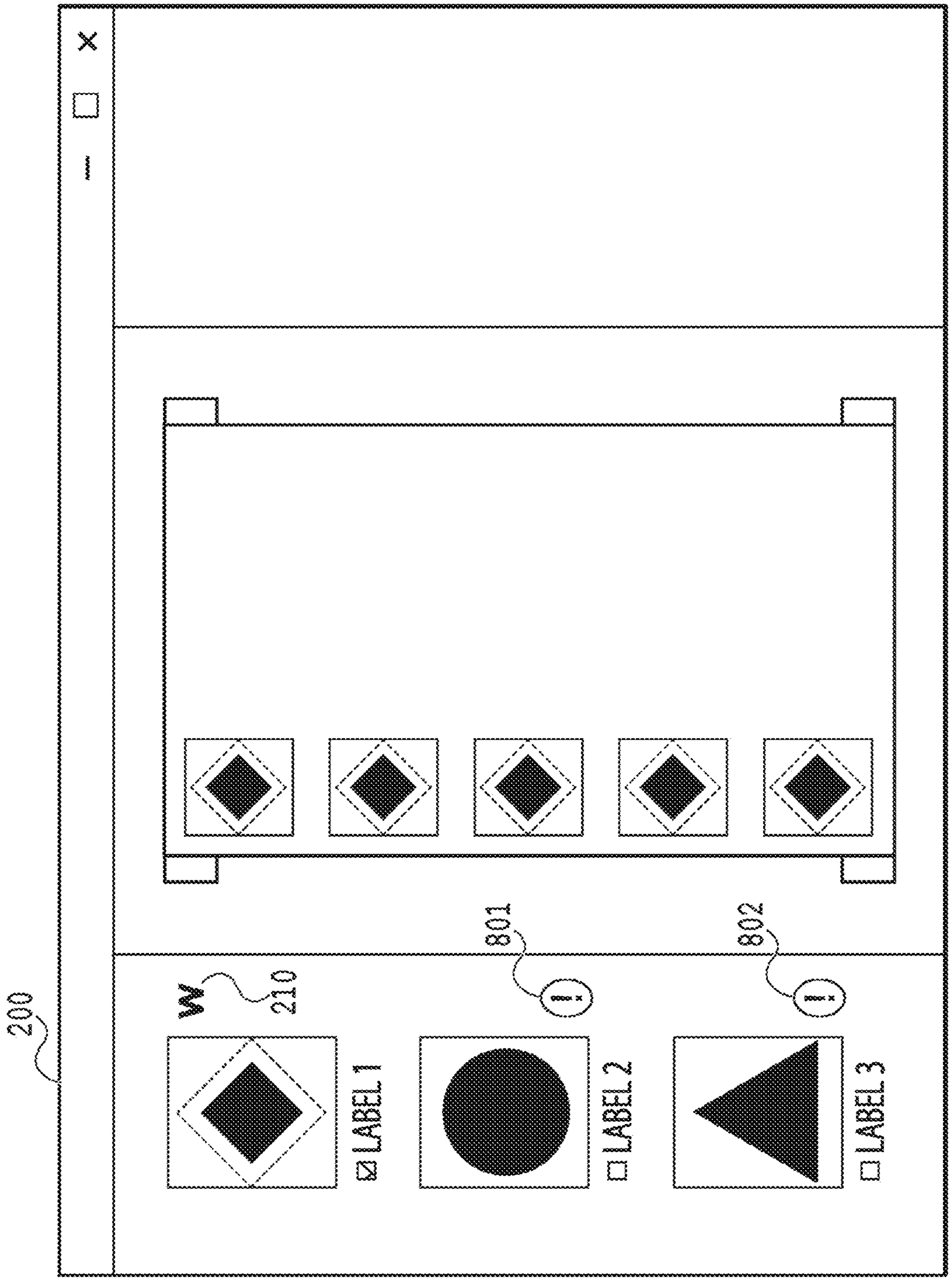
FIG. 8 is a diagram illustrating a warning mark.

FIG. 8 is a diagram for illustrating a warning mark. Warning marks 801 and 802 are displayed in a case where the check box 203 is marked to lay out the layout target data 202 with the particular color from the layout target data selection area 201 in the application screen 200 in FIG. 2, for example. That is, the warning marks are displayed near layout target data whose printing time is different from that of the layout target data selected in the layout target data selection area 201, and indicate that printing time of the selected target data is different from that of the printing target data which is in the layout state. Accordingly, for example, in a status in which the printing target data 204 without the particular color is in the layout state, a configuration in which the warning marks are added to the layout target data 202 with the particular color in the layout target data selection area 201 may be applicable. Further, in a case of an embodiment which display the warning marks, a configuration in which the warning messages explained in FIGS. 2 to 6 are not displayed may be applicable, and a configuration in which both the warning messages and the warning marks are displayed may be applicable.

Figure 9B:
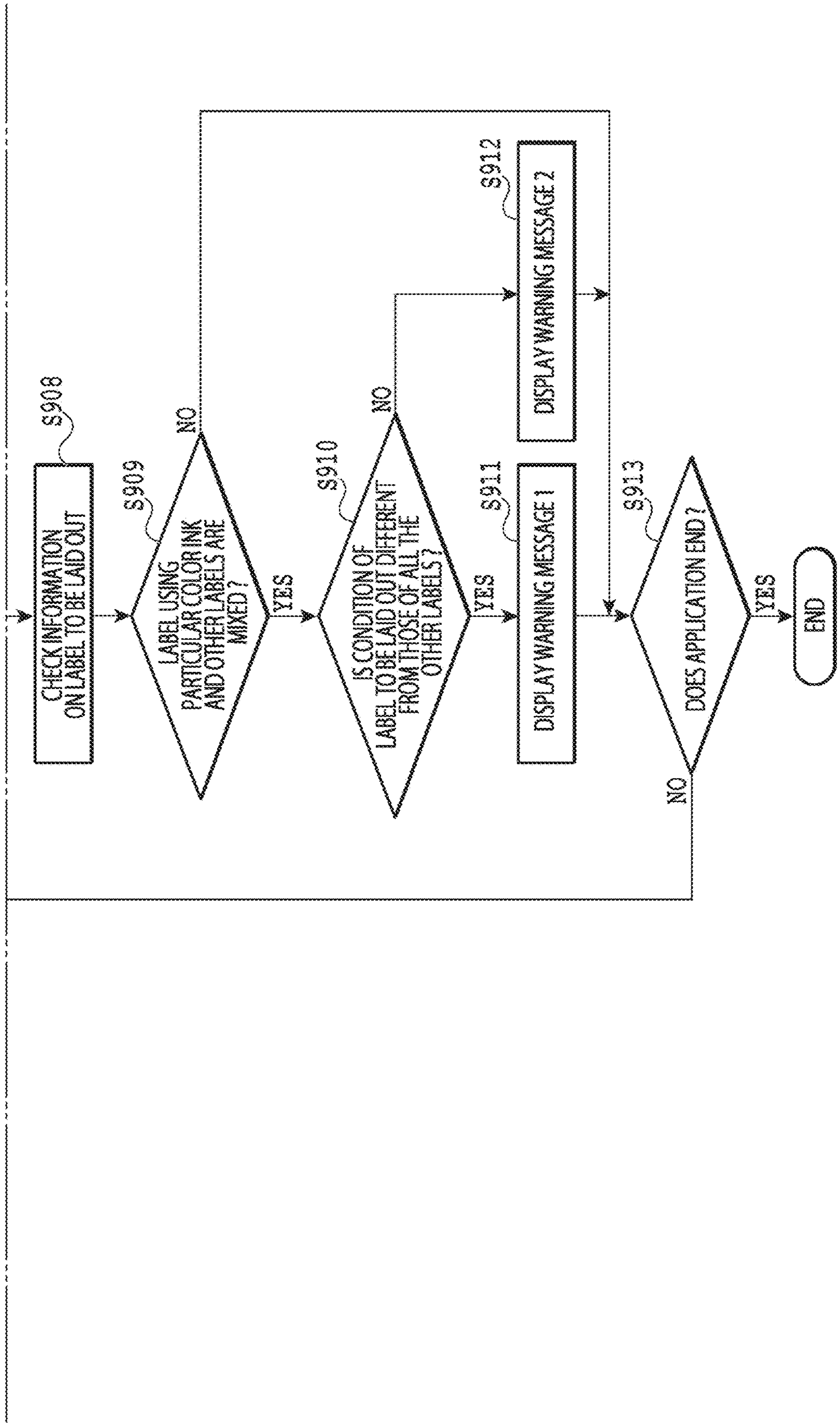

FIG. 9 is a flowchart showing layout processing of a label in the present embodiment. The processing of the present flowchart is implemented by the CPU 104 of the information processing apparatus 101 expanding in the RAM 106 and executing a program of an application stored in the ROM 105 or the storage apparatus 107. Further, in the processing of the present flowchart, the processing of the flowchart of FIG. 8 starts on condition that the application screen 200 is displayed by the application or OS. Incidentally, the symbol "S" in the explanation on processing of the present flowchart means a step in the flowchart, and the same applies to the subsequent drawings.

In S901, the CPU 104 of the information processing apparatus 101 obtains main body information from the printer 111 and stores the obtained information in the RAM 106. The CPU 104 stores the main body information in the external storage apparatus 107 as necessary. The main body information indicates information set in the main body such as a sheet type, a sheet size, a roll paper sheet width, a remaining ink amount, a remaining roll paper amount, a setting to perform particular color processing, or a setting to perform decoration which needs a drying process in the printing process. In a case where the setting to perform the particular color processing or the setting required for the decoration which needs the drying process in the main body information is performed, more printing processes are needed than in a case where these settings are not performed, and thus printing time increases. Thus, the CPU 104 distinguishes a piece of information which takes longtime to print and a piece of information which does not take long time to print in the main body information and stores the main body information including these pieces of information in the RAM 106.

In S902, the CPU 104 obtains label information which is information on the particular color in the layout target data displayed in the layout target data selection area 201 of the application screen 200. The CPU 104 stores the obtained label information in the RAM 106 and also stores the obtained label information in the external storage apparatus 107 as necessary.

In S903, the CPU 104 checks whether a setting of the particular color ink is included in the printing target data based on the obtained label information. Further, a check result is stored in the RAM 106. In S904, the CPU 104 determines whether the setting of the particular color ink is included in any layout target data. In a case where it is determined that the setting of the particular color ink is included, the CPU 104 proceeds to S905; in a case where it is determined that the setting of the particular color ink is not included, the CPU 104 proceeds to S906. In this case, there is no printing target data including the particular color ink. In S905, the CPU 104 registers layout target data which uses the particular color ink to the RAM 106.

In 906, the CPU 104 displays the layout target data in the layout target data selection area 201 of the application screen 200. At that time, the CPU 104 checks the layout target data which uses the particular color ink registered in S905 and displays a mark (for example, a W-mark illustrated in FIG. 2) 210 which indicates that the particular color ink is used in a case where the corresponding layout target data is displayed on an UI.

In S907, the CPU 104 determines whether any one piece of the layout target data in the layout target data selection area 201 of the application screen 200 is laid out. Layout processing is executed in the layout target data selection area 201 by marking the check box of the printing target data because of a user operation. In a case where it is determined in S907 that the label is laid out, the CPU 104 proceeds to S908. In contrast, in a case where it is determined that the label is not laid out, the CPU 104 waits until the label is laid out.

In S908, the CPU 104 checks label information on the laid-out printing target data. In S909, the CPU 104 determines whether the layout state of the layout area is a state where the printing target data with the particular color and the printing target data without the particular color are mixed. In a case where the CPU 104 determines that the layout state is not a state where the printing target data with the particular color and the printing target data without the particular color are mixed, the CPU 104 proceeds to S913. In a case where the CPU 104 determines that the layout state is a state where the printing target data with the particular color and the printing target data without the particular color are mixed, the CPU 104 proceeds to S910. That is, a condition that the CPU 104 proceeds to YES in this step is a case where at least two labels or more are laid out and the printing target data with the particular color and the printing target data without the particular color are mixed. Therefore, in a case where the first printing target data is laid out in a layout area in a state where nothing is laid out, no warning message is displayed because the printing target data with the particular color and the printing target data without the particular color are not mixed regardless of which printing target data is the first printing target data.

In S910, the CPU 104 determines whether a condition of layout target data to be laid out is different from that of all printing target data which has been laid out. Here, the condition indicates whether to use the particular color ink or not. In a case where the CPU 104 determines that the condition of the layout target data to be laid out is different from that of all the printing target data which has been laid out, the CPU 104 proceeds to S911. In contrast, in a case where it is determined that the condition of the layout target data to be laid out is no different from that of all the printing target data which has been laid out, the CPU 104 proceeds to S912. That is, in a case where the CPU 104 determines that layout target data with the same condition as that of any printing target data which has been laid out is to be laid out, the CPU 104 proceeds to S912.

S910 is specifically explained. For example, in a case where the layout target data with the particular color is arranged in the second column in a state that the printing target data without the particular color is arranged in the first column, the CPU 104 determines that the answer is YES because both the layout target data with the particular color and the printing target data without the particular color are different in the condition as to whether the particular color is used or not. Further, in a case where the layout target data without the particular color is arranged in the third column in a state where the printing target data with the particular color is arranged in the first column and the second column, the CPU 104 determines the answer is YES because the condition of the layout target data without the particular color is different from that of all the printing data which has been arranged. In contrast, consider a state where the printing target data without the particular color is arranged in the first column and the printing target data with the particular color is arranged in the second column. In this case, whichever of the layout target data with the particular color and the layout target data without the particular color is arranged in the third column, the condition is the same as the condition of either of the printing target data with the particular color and the printing target data without the particular color which have been laid out, the CPU 104 determines that the answer is NO in S910.

In S911, the CPU 104 displays the warning message 1 (the warning message 300 illustrated in FIG. 3). Thereby, in a case where the YES button 301 is selected, processing to replace the layout target data to be laid out so as to satisfy the same condition as that of the printing target data which has been laid out can be executed. Any printing target data whose replacement is completed in the layout area has the same condition.

In S912, the CPU 104 specifies whether the printing target data whose amount is smaller is printing target data with the particular color or without the particular color by checking label information on the layout target data to be laid out and the printing target data which has been laid out. That is, the CPU 104 specifies in what number column (lane) the printing target data having a printing process of the type of printing target data whose amount is smaller is out of the printing target data whose type of printing process is the presence of the particular color and the printing target data whose type of printing process is the absence of particular color. Further, the warning message 2 (the warning message 600 illustrated in FIG. 6) as to whether to replace the printing target data in the specified column with printing target data having a printing process of the type of printing target data whose amount is larger is displayed. The wording of the warning message 2 is changed according to in what number column printing target data having a different condition from that of the printing target data in other columns (that is, having the printing process of the type of printing target data whose amount is smaller) is arranged. For example, in a case where printing target data whose printing time is different is arranged in the second column, the message says "LABEL DATA IN SECOND LANE IS DIFFERENT FROM OTTER LABEL DATA IN PRINTING TIME . . . . " Thus, this means that the printing target data in the layout area in which the replacement is completed is printing target data having the same condition in a case where the YES button 601 is selected.

In S913, the CPU 104 determines whether an operation to end the application screen 200 is performed. If the CPU 104 determines that the operation to end the application screen 200 is not performed, the CPU 104 returns to S907 and waits until accepting a user operation. If the CPU 104 determines that the operation to end the application screen 200 is performed, the CPU 104 ends processing of the present flowchart.

As mentioned above, based on the present embodiment, the efficiency of printing in the particular color ink can be improved. Specifically, in a case where the printing target data with the particular color and the printing target data without the particular color are mixed, a massage as to whether a layout pattern takes long time to print is displayed by a layout operation, and this allows the user to easily determine printing target data to lay out. Further, a layout in which the printing target data with the particular color and the printing target data without the particular color are mixed can be resolved by an operation in the warning message, and thereby printing time can be shortened.

Incidentally, in the embodiment mentioned above, the warning message 2 as to whether to replace the printing target data which is printing target data in the specified column and which has the printing process of the type of printing target data whose amount is smaller with the printing target data which has the printing process of the type of printing target data whose amount is larger is displayed. Further, an embodiment executing processing to replace the printing target data having the printing process of the type of printing target data whose amount is smaller with the printing target data having the printing process of the type of printing target data whose amount is larger has been explained. However, the column of the printing target data having the printing process of the type of printing target data whose amount is larger may be specified and the warning message as to whether to replace the printing target data having the printing process of the type of printing target data whose amount is larger with the printing target data having the printing process of the type of printing target data whose amount is smaller may be displayed. That is, processing to replace the printing target data having the printing process of the type of printing target data whose amount is larger with the printing target data having the printing process of the type of printing target data whose amount is smaller may be executed.

Further, the user can easily determine which is layout target data which is a combination of layout target data which takes long time to print by displaying the warning mark for layout target data which is the combination of layout target data which takes long time to print in the layout target data selection area 201.

Incidentally, in addition to printing in the particular color ink, a similar measure can be applied to a printing stetting which takes time such as a decorative printing setting which needs a drying process.

Embodiment 2

Embodiment 1 shows a method for displaying the warning message according to an arrangement state of the printing target data with the particular color and the printing target data without the particular color. In the present embodiment, a method for displaying a warning in a case where printing target data 202 with the particular color is not displayed in a layout area 209 and in a case where the printing target data 202 with the particular color is displayed in the layout area 209 according to a selection state of the printing target data in the layout target data selection area 201 is explained. In a layout of label data, for example, in a case where a number is printed, numbers can be laid out from the upper left to the upper right in ascending numeric order, not along a lane. In a case of such a special layout, in the layout area 209, a visual check of the laid-out printing target data cannot be made immediately in some cases. For example, there is a case where the printing target data with the particular color is arranged in a lower portion of the layout area and cannot be checked on the display. In such a case, it is considered that the arrangement which is not displayed is checked by performing a scroll operation or the like, but there is a case where a user does not understand which is printing target data with the particular color in the first place. In such a case, it is probable that printing takes much time in a case where the user unknowingly performs printing.

Figure 10:
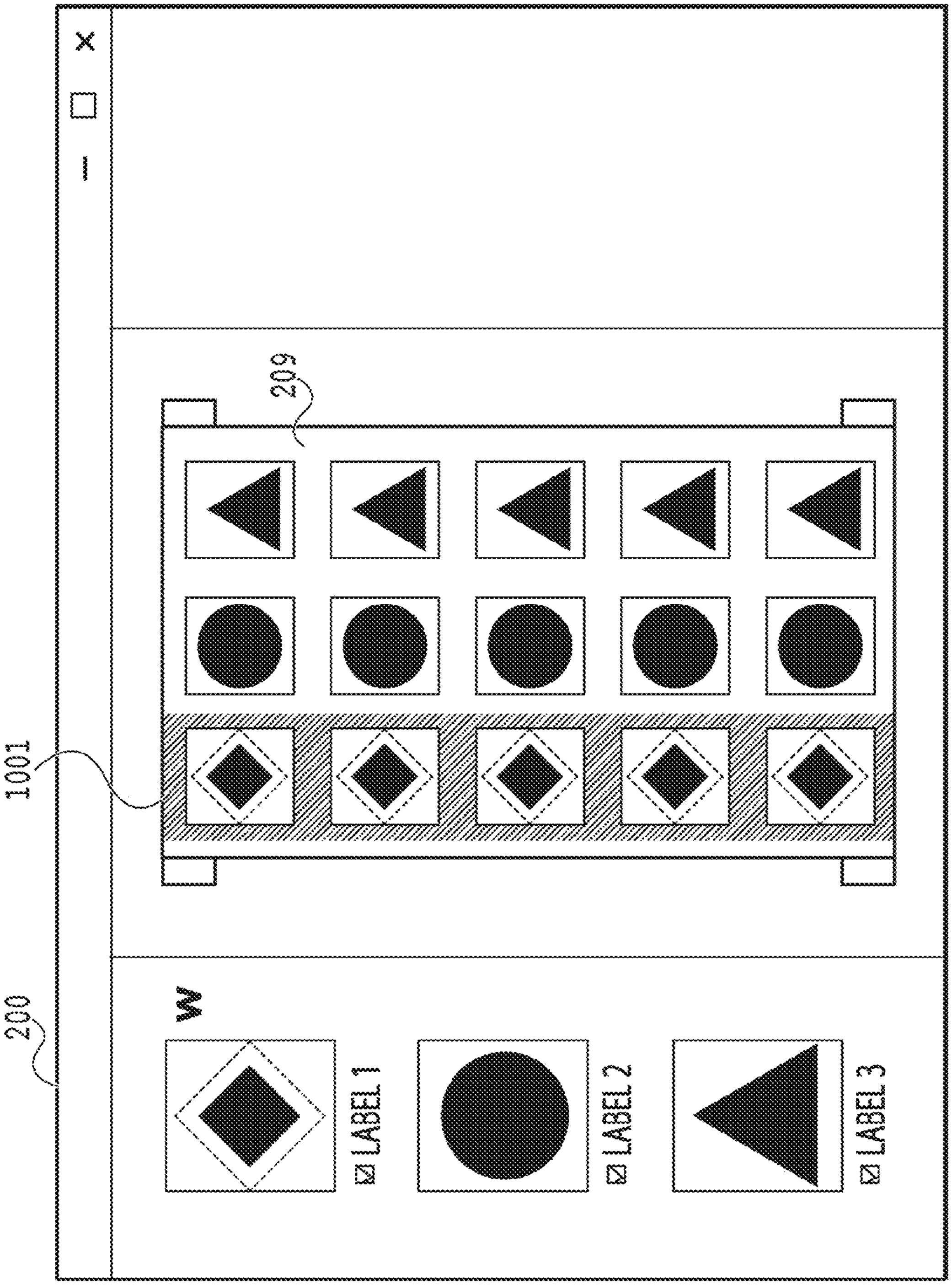
FIG. 10 is a diagram showing a display screen of the print application.

FIG. 10 illustrates behavior of a method for displaying a warning in a case where the printing target data 202 with the particular color is displayed in the layout area 209 based on the selection status of layout target data in the layout target data selection area 201. As illustrated in FIG. 9, in a case of a display such that the printing target data 202 with the particular color can be visually checked by the user, unlike the method explained in Embodiment 1, a display in which enhancement processing which is different from that of other lanes is applied to the printing target data 202 is performed. That is, for example, as illustrated in FIG. 10, the first lane is grayed out and displayed. Compared with the display of the warning message, this enables the user to more directly recognize that the printing target data with the particular color is arranged.

Figure 11:
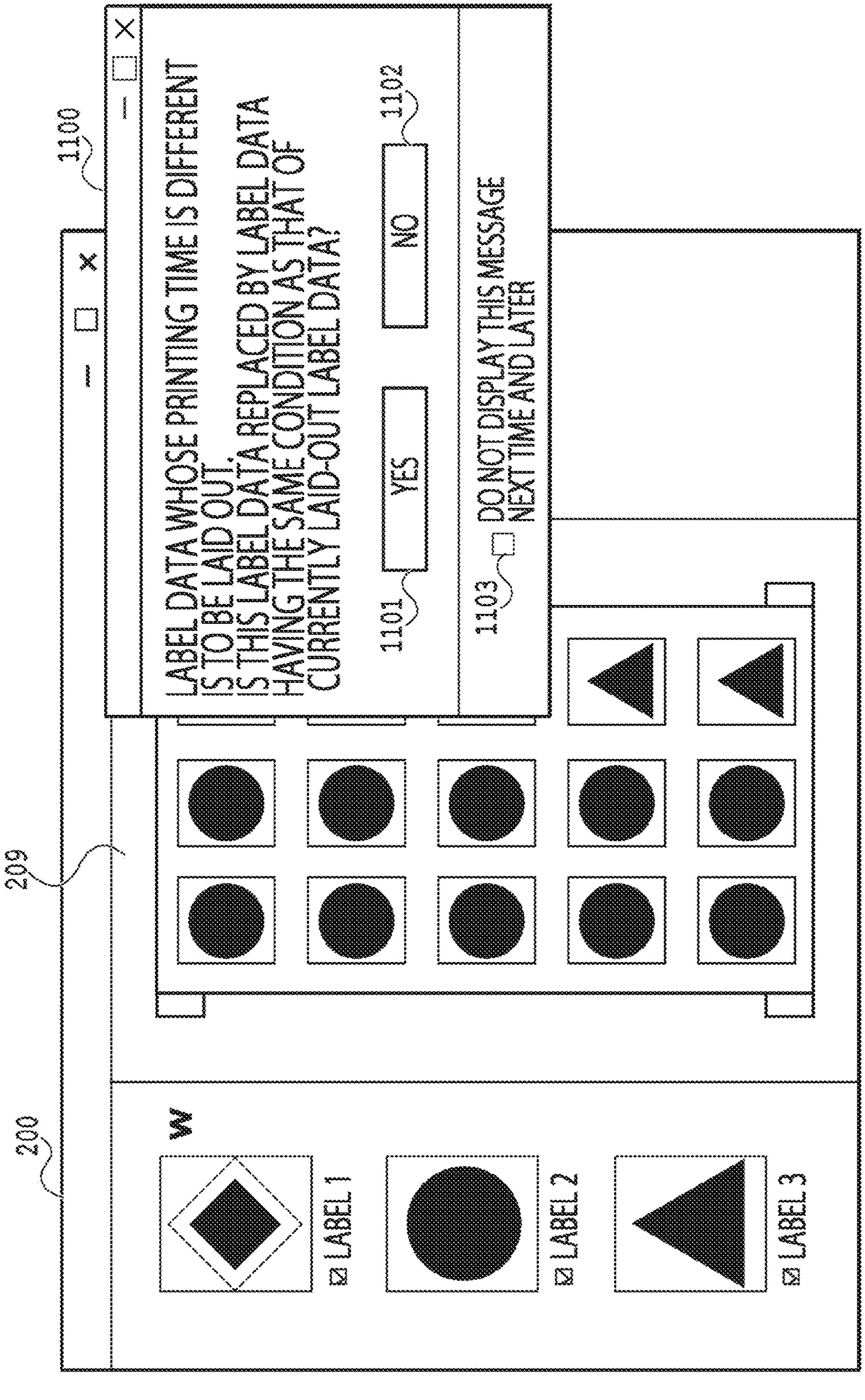
FIG. 11 is a diagram showing an example of a warning message.

FIG. 11 illustrates behavior of a method for displaying a warning in a case where the printing target data 202 with the particular color is not displayed in the layout area 209 based on the selection status of the layout target data of the layout target data selection area 201. The warning message is displayed in a case where the printing target data is actually laid out but cannot be checked at first glance on display. This can reduce the possibility of the mixture of the printing target data with the particular color and the printing target data without the particular color in the same layout area.

Figures 12, 12A:
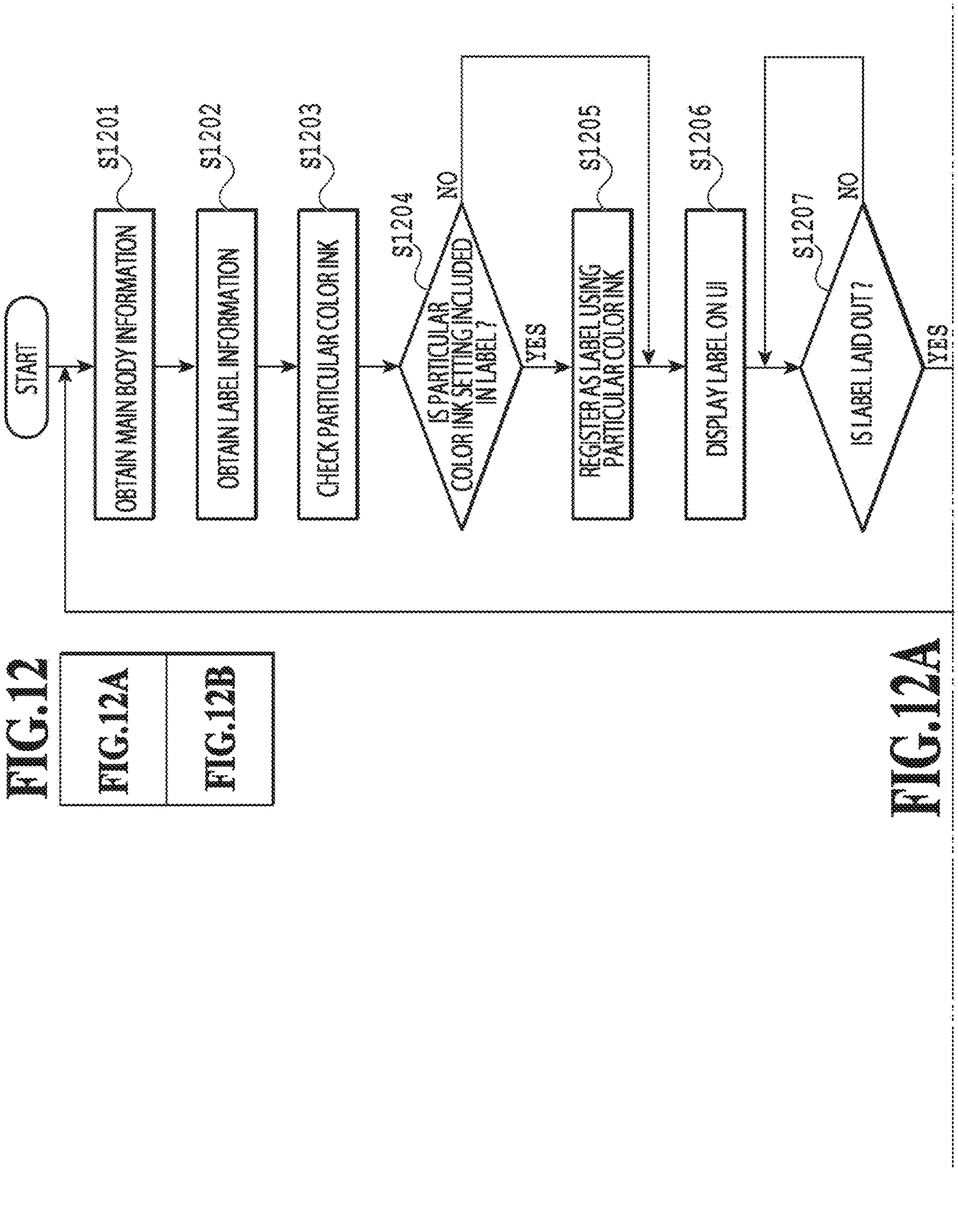
FIG. 12 is a diagram showing the relationship of FIGS. 12A and 12B.
FIGS. 12A and 12B are flowcharts for performing a warning display.
Figure 12B:
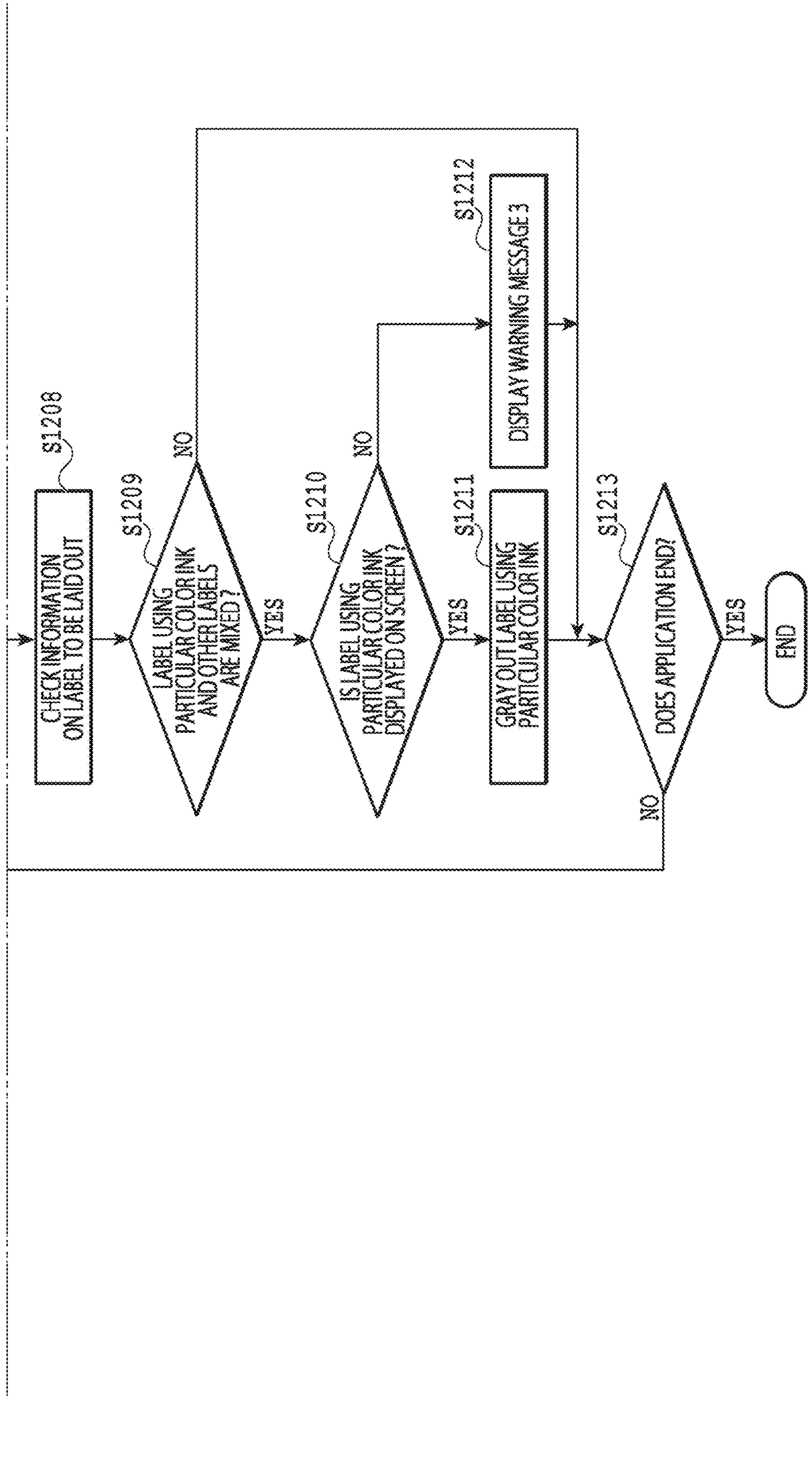

FIG. 12 is a flowchart showing layout processing of a label in the present embodiment. Processing of the present flowchart is implemented by a CPU 104 of an information processing apparatus 101 expanding in a RAM 106 and executing a program of an application stored in a ROM 105 or a storage apparatus 107. Further, in processing of the present flowchart, processing of the flowchart of FIG. 8 starts on condition that an application screen 200 is displayed by the application or OS.

Processing in S1201 to S1206 is the same processing in S901 to S906 of FIG. 9, and thus an explanation is omitted. In S1207, the CPU 104 determines whether any one piece of the printing target data in the layout target data selection area 201 of the application screen 200 is laid out. In a case where the CPU 104 determines that any one piece of the printing target data is laid out, the CPU 104 proceeds to S1208. In a case where the CPU 104 determines that none of the printing target data is laid out, the CPU 104 waits until the user performs an operation to lay out the printing target data in S1207.

In S1208, the CPU 104 checks label information to be laid out. In 1209, the CPU 104 determines whether printing target data or layout target data which has a different condition (that is the type of printing process) is arranged in a mixed layout. In a case where the CPU 104 determines that printing target data or layout target data which has a different condition is not mixed, the CPU 104 proceeds to S1213. In a case where the CPU 104 determines that printing target data or layout target data which has a different condition is mixed, the CPU 104 proceeds to S1210.

In S1210, the CPU 104 determines whether a layout of the printing target data with the particular color is displayed in the currently displayed layout area 209. In a case where the CPU 104 determines that the layout of the printing target data with the particular color is displayed, the CPU 104 proceeds to S1211, and in a case where the CPU 104 determines that the layout of the printing target data with the particular color is not displayed, the CPU 104 proceeds to S1212.

In S1211, the CPU 104 grays outs and displays the printing target data with the particular color, as illustrated in FIG. 10. In S1212, the CPU 104 displays a warning message 3 (a warning message 1100 illustrated in FIG. 11) illustrated in FIG. 11. Further, based on a user operation of the warning message 3, the CPU 104 executes processing to reduce the possibility of the mixture. An explanation on S1213 is omitted because S1213 is the same processing as S913 of FIG. 9. After the completion of S913, the CPU 104 ends processing of the present flowchart.

The above processing is the processing of the flowchart of the present embodiment. Based on the present embodiment, in a case where the printing target data with the particular color and the printing target data without the particular color are mixed, the printing target data with the particular color is grayed out and displayed in a case where the printing target data with the particular color can be checked on a screen, and in a case where the printing target data with the particular color cannot be checked on the screen, the warning message is displayed. This can reduce the possibility of the execution of printing in a state where both the printing target data with the particular color and the printing target data without the particular color are mixed in the same layout area. That is, printing time can be shortened.

Incidentally, in the present embodiment, an object to be warned is explained as the printing target data with the particular color, but is not limited to this. For example, an embodiment in which the printing target data without the particular color is grayed out in the mixed layout may be applicable. Further, an embodiment in which the amount of the printing target data with the particular color is compared with the amount of printing target data without the particular color to gray out the printing target data whose amount is smaller may be applicable.

Incidentally, in addition to printing in which a particular color ink is used, a similar measure can be taken for a printing setting which takes time such as a decorative printing setting which needs a drying step.

OTHER EMBODIMENTS

The above embodiments explain that the printing target data is arranged in three columns on a roll of paper, but actually, embodiments are not limited to this. For example, an embodiment in which printing target data is arranged in four columns on a roll of paper may be applicable. In such a case, the possibility of the mixture can be reduced by replacing the printing target data according to the arrangement status of target data with the particular color and target data without the particular color. For example, in a case where more printing target data with the particular color is arranged than the printing target data without the particular color in a status in which four columns of printing target data are arranged, a message to execute processing to replace the printing target data without the particular color with the printing target data with the particular color has only to be displayed. Further, in a case where the amount of the printing target data with the particular color is equal to that of the printing target data without the particular color in a status in which four columns of printing target data are arranged, replacement has only to be performed so as to prioritize the condition of the printing target data which is arranged first. That is, the replacement has only to be performed so as to prioritize the type of printing process which the printing target data arranged first has. Incidentally, the printing target data may be arranged in four columns or more on a roll of paper.

Further, in the above embodiment, the warning message is displayed in a case where the printing target data with the particular color and the printing target data without the particular color are mixed, but is not limited to this. For example, a warning saying that a label takes time in a case where the layout target data with the particular color is laid out in the first column in a state where nothing is laid out may be displayed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-139920, filed Aug. 30, 2023, which is hereby incorporated by reference wherein in its entirety.

What is claimed is:

1. An information processing apparatus, comprising:

at least one memory storing code of a program; and at least one processor and/or at least one circuit which executes the program to perform:

obtaining information on a type of printing process in a case where target data is printed;

accepting an operation to lay out the target data in a layout area; and providing a notification about target data to be laid out in the layout area in a case where the target data whose type of printing process is different is included in the layout area by the accepted operation to lay out the target data in the layout area, wherein a first notification is provided in a case where, as a result of the target data being laid out in the layout area by the accepted operation, an amount of first target data which has been laid out in the layout area and which is to be printed in a first type of printing process is different from an amount of second target data which has been laid out in the layout area and which is to be printed in a second type of printing process.

2. The information processing apparatus according to claim 1, wherein printing time in a case where the target data is printed varies depending on the type of printing process.

3. The information processing apparatus according to claim 1, wherein the notification about the target data to be laid out in the layout area is a notification about printing time in a case where the target data is printed.

4. The information processing apparatus according to claim 1, wherein a second notification is provided in a case where the type of printing process of the target data in which the accepted operation is different from that of printing process of all target data which has been laid out in the layout area.

5. The information processing apparatus according to claim 4, wherein the second notification is a notification in which it is possible to select whether to change the target data to be laid out in the layout area from the target data in which the operation is accepted to target data having the type of printing process included in the target data which has been laid out in the layout area.

6. The information processing apparatus according to claim 1, wherein the first notification is a notification in which it is possible to select whether to replace one of the first target data and the second target data which is smaller in amount with target data to be printed in a similar type of printing process to that of the other of the first target data and the second target data which is larger in amount as a result of the target data in which the operation is accepted being laid out in the layout area.

7. The information processing apparatus according to claim 1, wherein the type of printing process includes presence or absence of use of a particular color ink.

8. The information processing apparatus according to claim 7, further comprising:

a display configured to display the layout area;

wherein in a case where the target data in which the operation is accepted is target data using the particular color ink, the display displays target data not using the particular color ink with information indicating the target data not using the particular color ink in a selection area in which target data to be laid out in the layout area is selected.

9. The information processing apparatus according to claim 7, further comprising:

a display configured to display the layout area;

wherein in a case where target data using the particular color ink is displayed in the layout area and in a case where the target data using the particular color ink and the target data not using the particular color ink are mixed and laid out in the layout area as a result of the target data in which the operation is accepted being laid out in the layout area, the display highlights a part of the layout area in which the printing target data using the particular color ink is laid out in the layout area.

10. The information processing apparatus according to claim 9, wherein the highlighting includes graying out.

11. The information processing apparatus according to claim 7, further comprising a display configured to display the layout area;

wherein in a case where target data using the particular color ink is not displayed in the layout area and in a case where the target data using the particular color ink and target data not using the particular color ink are mixed and laid out in the layout area as a result of the target data in which the operation is accepted being laid out in the layout area, the display provides a third notification.

12. The information processing apparatus according to claim 11, wherein the third notification is a notification in which it is possible to select whether to change target data to be laid out in the layout area from the target data in which the operation is accepted to target data having the type of printing process included in target data which has been laid out in the layout area.

13. A non-transitory computer readable storage medium storing a program which to be executed by a processor in an information processing apparatus and causes the information processing apparatus to:

obtain information on a type of printing process in a case where target data is printed;

accept an operation to lay out the target data in a layout area; and provide a notification about target data to be laid out in the layout area in a case where the target data whose type of printing process is different is included in the layout area by the accepted operation to lay out the target data in the layout area, wherein a first notification is provided in a case where, as a result of the target data being laid out in the layout area by the accepted operation, an amount of first target data which has been laid out in the layout area and which is to be printed in a first type of printing process is different from an amount of second target data which has been laid out in the layout area and which is to be printed in a second type of printing process.

14. A method for controlling an information processing apparatus comprising:

obtaining information on a type of printing process in a case where target data is printed;

accepting an operation to lay out the target data in the layout area; and providing a notification about target data to be laid out in the layout area in a case where the target data whose type of printing process is different is included in the layout area by the operation to lay out the target data accepted in the accepting in the layout area, wherein a first notification is provided in a case where, as a result of the target data being laid out in the layout area by the accepted operation, an amount of first target data which has been laid out in the layout area and which is to be printed in a first type of printing process is different from an amount of second target data which has been laid out in the layout area and which is to be printed in a second type of printing process.

* * * * *